Patented Aug. 30, 1949

2,480,206

UNITED STATES PATENT OFFICE 2,480,206

MODIFIED DRYING OIL COMPOSITIONS, METHODS OF MAKING THE SAME, AND METHODS OF COATING AND UNITING SHEET MATERIALS THEREWITH

Leo R. Whiting, Woodbridge, N. J., assignor to Bakelite Corporation, a corporation of New Jersey No Drawing. Application February 20, 1945, Serial No. 578,943

20 Claims. (Cl. 154—140)

This invention relates to a catalytic process for converting fatty oil compositions into infusible products, more specifically to the induration as by polymerization of fatty oil compositions in which the fatty oil or the fatty acids derived therefrom possess a conjugated system of carbon-to-carbon double bonds, and to the products thereby obtained.

Fatty drying oils containing conjugated double bonds in their molecular structure, e. g. tung oil, oiticica oil, isomerized drying oils and dehydrated castor oil containing the glyceryl esters of 9, 11-octadecadienoic-1-acid, are converted upon being heated to high temperatures of the order of 250° C. and higher, into solid infusible gels characterized by a weak and crumbly texture. The infusible solid gels thus obtained are considered to be 3-dimensional type polymers on the assumption that cross linkages occurring between the double bonds during the reaction are intermolecular and intramolecular. Harder gelled products can be obtained by polymerizing such fatty oils in the presence of fatty oil-soluble resins, but high temperatures are still required to effect gelation within a reasonable time period. The formation of these gelled masses in situ as coatings, impregnants or molding materials has not been feasible because of the high temperatures required for polymerization, and therefore little use has been made of them despite their otherwise useful properties, such as infusibility and chemical and solvent resistance.

To circumvent the requirement of high temperatures for gelation, which preclude the polymerization in situ of these fatty oils when applied as coatings to heat-sensitive surfaces, such as wood or paper, or when mixed with organic fibrous fillers decomposable at the polymerizing temperature for the production of molding compositions, the practice has been to only partially polymerize the fatty material, either in the presence or absence of an oil-soluble resin, to form highly viscous masses and then to disperse them if necessary in a suitable solvent. The solvent-diluted partially-polymerized fatty material is easily applied as a coating to surfaces or can be readily mixed as a binder with fillers in the production of molding compositions; upon evaporation of the solvent, however, a viscous to semi-solid mass of fatty material remains, and the mass is further hardened to a solid state by absorption of atmospheric oxygen uniting chemically with the fatty material apparently by initially saturating the remaining double bonds. The oxygen absorption or "drying" is usually catalytically promoted by the incorporation of siccatives such as metallic salts or oxides in the fatty material. The durability of the oxygen-hardened fatty materials is of a lower order than fatty materials rendered into gel like masses by heat-polymerization methods alone, since oxidation of fatty oils containing siccatives does not cease with the initial saturation of the remaining double bonds, but continues thereafter to ultimately decompose or destroy the film.

It has now been found that fatty oils of the conjugated type can be completely polymerized or indurated to an infusible solid state in the absence of oxygen and at temperatures low enough to permit the polymerization to take place in situ on heat-sensitive surfaces or in admixture with heat-decomposable fibrous fillers. The indurated fatty material can be prepared in a number of ways as will be apparent hereinafter, but common to all the procedures is the presence of a catalyst composition comprising an admixture of two components, neither of which alone has any appreciable catalytic activity in accelerating the induration of fatty oils of the conjugated type. One component of the catalyst composition consists of an oxy compound of boron, specifically those boron compounds in which at least one oxygen atom is directly linked to boron. The other component of the catalyst composition consists of an organic carboxylic acid or anhydride selected from a group consisting of oxalic acid, alpha-hydroxy-aliphatic acids, ortho-hydroxy-aromatic acids, and compounds of such acids which yield the acid radical upon hydrolysis, ester interchange, etc.

Indicative but not exclusive of oxygen-containing compounds of boron found effective in conjunction with the second component of the catalyst composition are the oxides of boron such as $B_2O_3$, the acids of boron namely ortho and metaboric acids, the saturated and unsaturated aliphatic and aromatic esters of the boron acids (as exemplified by monoboro-glyceride, triamyl borate, triallyl borate and triphenyl borate), the alkali and alkaline boron salts (such as borax, sodium perborate, and ammonium borate) and the borates of heavy metals (for instance copper borate and manganese borate).

Representative of the hydroxy organic acids which have been found operable as the second component of the catalyst composition are hydrated and anhydrous oxalic acids, mesoxalic acid, citric acid, tartaric acid, hydroxy acetic acid, α-hydroxypropionic acid, α-hydroxybutyric acids, salicylic acid, and the various cresotic acids having a hydroxyl group ortho to the carboxyl group. The saturated and unsaturated aliphatic esters of these acids are also catalytically effective when in admixture with an oxygen-containing boron compound.

The catalytic activity of the various possible catalyst compositions that may be prepared is generally dependent upon the catalyst concentration and the temperature at which polymerization of the fatty material is initiated. At room temperature in the presence of the various catalyst compositions, polymerization of conjugated fatty materials into an infusible state occurs, with some exceptions, only after a protracted interval amounting to several days; but with rising temperatures, the time required for gelation decreases rapidly so that at about 70° C. less than an hour is required with some of the more active compositions, and at temperatures in the range of 150° C. to 200° C. the gelation is practically instantaneous for almost all the catalyst compositions. Usually a catalyst composition containing equimolecular proportions of each component is the optimum proportion for obtaining maximum gelation speed when present in a concentration not exceeding five per cent on the weight of the conjugated fatty material; catalyst concentrations above five per cent are not objectionable except for increased cost, and the minimum concentrations are about 0.1% for each of the components of the catalyst composition.

Preferably, at least one component of the catalyst compositions is an acid or an acid anhydride, and usually it has been found desirable that the non-boron component be of the acidic type. When both components are of a non-acidic type a longer induction period transpires before gelation takes place, and it is believed that during this period hydrolysis or ester interexchange occurs between the non-acidic components whereby either the boron component or the esters of the alpha-hydroxy-aliphatic acids, ortho-hydroxy-aromatic acids, or oxalic acid are converted into acids or free acid radicals.

The more active catalyst compositions are mixtures of orthoboric acid, esters of boric acid, or boron-oxide ($B_2O_3$) with the following acids, the activity decreasing in the order given; anhydrous oxalic acid, hydrated oxalic acid $(COOH)_2 \cdot 2H_2O$, salicylic acid, lactic acid, tartaric acid and citric acid. An extremely active catalyst composition can be obtained by initially heating ortho-boric acid with any of the aforementioned hydroxy acids including oxalic acid or their esters at temperatures above 100 C. to cause fusion of the acids with elimination of water and yielding a crystalline or powdery residue. Such anhydrous residues show extreme catalytic activity, causing almost instantaneous gelation of tung oil at room temperature.

The gelled products resulting from the polymerization of fatty oils of the conjugated type in the presence of these catalyst compositions are similar with respect to flexibility and texture to the gels obtained by heating the fatty oils to high temperatures in the absence of catalysts. Analytical examination of the two types of gel, however, discloses important differences in that the gels obtained in the presence of the catalyst compositions are undoubtedly of higher molecular weight and complexity with a smaller amount of residual unsaturated bonds as evidenced by the absence of surface stickiness, a lower content of petroleum ether extractibles and a smaller susceptibility to oxidation.

Despite the fact that the catalyst composition may contain an acid as one or both components, it is surprising to find that the resulting gelled fatty material in which the catalyst is imprisoned has excellent electrical properties, such as low power factor, high D. C. resistivity and good arc resistance as determined by A. S. T. M. method D495–38T. Furthermore, the gelled materials are resistant to many organic solvents, such as alcohols, ketones, esters, and aliphatic and aromatic hydrocarbons. They withstand the attack of even concentrated alkali and alkaline aqueous solutions and are practically completely water-resistant.

As previously mentioned, the incorporation of a fatty oil-soluble resin in a fatty oil of the conjugated type prior to its gelation materially improves the hardness of the gelled composition, and, since the presence of catalyst composition effects polymerization at lower temperatures, volatile losses due to decomposition of the resin or the oil are negligible and the resulting product is substantially free from bubbles; the presence of resin also contributes to the surface gloss of the gelled masses and increases resistance to abrasion and weathering. The ratio of fatty oil to oil-soluble resin is not critical with respect to interference with the gelation of the fatty material. As the amount of resin is increased, however, especially when the resin is of the permanently fusible type (such as ester gum, cumarone and the non-heat-hardenable fatty oil-soluble phenolic resins), the gelled products exhibit less rigidity when exposed to high temperatures and partake to a greater extent of the properties of the resin; but even with a high concentration of fusible resin, such as nine parts of resin to one part of fatty oil, the gelled products do not completely liquefy when exposed to temperatures at which the untreated resin behaves as a liquid body, and instead merely soften sufficiently to have enough plastic flow to enable them to be used as hot-compression or extrusion molding compounds that upon cooling to room temperatures after extrusion reacquire their former rigidity. Heat-reactive fatty oil-soluble resins (such as heat-reactive oil-soluble phenolic resins, the fatty oil or natural resin-modified ester-reaction products of polyhydric alcohols, and the cyclopentadiene adduct of maleic-anhydride), when dispersed in fatty oils of the conjugated type and heated in the presence of the afore-described catalyst compositions, yield gels that are not only hard and tough at room temperature but substantially retain their infusibility upon exposure to elevated temperatures, somewhat like vulcanized rubber that is characterized as "hot short."

Fillers that can be admixed with the fatty oils prior to polymerization include all the fibrous and nonfibrous fillers, such as cork, wood flour, asbestos, mica, textile fibers, graphite, abrasive grains, etc., commonly used in conventional molding compositions. Drying of the fillers to a low moisture content is of advantage, since excessive moisture content tends to inhibit the catalytic action; maximum catalytic activity is secured when the fillers are dried to a free moisture content of less than one per cent. Pigments and pigment extenders that are non-reactive with the fatty oils, such as the titanium pigments, Prussian blue, chromium oxide, barytes, silica whiting, ochres, siennas, umbers and synthetic iron oxides, may be included in the fatty oil compositions for obtaining a color other than the characteristic amber color of the gelled material.

The following are examples of specific methods and catalyst compositions for gelling or indurating fatty oils of the conjugated type. Unless otherwise noted all parts are by weight.

*Example 1.*—Tung oil of commercial purity, in the absence of catalyst, will form a rigid, dry, infusible gel in less than 4 minutes when held at a temperature of 340° C.; at lower temperatures a gelled product that is less rigid and inclined to be sticky can be obtained, but there is required a longer time for its formation, being about an hour at 230° C. and almost 4 hours at a temperature of 200° C. For comparison, there is shown in the following Tables 1 and 2 the speed with which the gelation of tung oils takes place at different temperatures and concentrations of the catalyst compositions defined by the present invention; in Table 2 the catalyst compositions are molar mixtures of ortho-boric acid or boron-oxide, $B_2O_3$, with various hydroxy acids including oxalic acid and its ethyl ester; and in each instance 10 grams of the catalyst composition were dispersed in 60 cc. of tung oil and the composition then heated to the designated polymerizing temperatures.

Table 1

| | Catalyst Composition per 100 Grams of Tung Oil | Polymerizing Temperature, °C. | Gel Time |
|---|---|---|---|
| 1 | 5.2 cc. triamyl borate, 1 gram hydrous oxalic acid. | 148 | less than 5 min. |
| 2 | 5.2 cc. triamyl borate, 1 gram tartaric acid. | 148 | 2 hours. |
| 3 | 5.2 cc. triamyl borate, 1 gram citric acid. | 148 | 6 hours. |
| 4 | 5.2 cc. triamyl borate, 1 gram salicylic. | 200 | less than 1 min. |

Table 2

| | Catalyst Composition | Polymerizing Temperature, °C. | Gel Time |
|---|---|---|---|
| 1 | Oxalic acid (hydrated) and boric acid. | 99 | 15 minutes. |
| 2 | Oxalic acid (anhydrous) and $B_2O_3$. | 99 | 4 minutes. |
| 3 | Oxalic acid (hydrated) and boric acid (acids fused together at 135° C. with 38% volatile loss before adding to tung oil). | 99 | 5 minutes. |
| 4 | Diethyl oxalate and boric acid (refluxed into solution and filtered before adding to tung oil). | 25 | 1 minute. |
| 5 | Salicylic acid and boric acid | 99 | 110 minutes. |
| 6 | Lactic acid and boric acid | 99 | over 16 hours. |

*Example 2.*—One hundred (100) parts of oiticica oil and 5 parts of hydrated oxalic acid were heated to 150° C. and adequately stirred to disperse the acid in the oil; upon the addition of 2 cc. of triamyl-borate to the hot oil, the oil gelled immediately to form an infusible solid body. Similarly, isomerized linseed oil, having added thereto one part of anhydrous oxalic acid and 1 part of ortho-boric acid, gelled spontaneously when heated to 150° C. A synthetic drying oil consisting of the pentaerythritol esters of conjugated linseed fatty acids formed a rubbery gel upon heating for 3 minutes at 135° C., 50 grams of the oil containing 2 grams anhydrous oxalic acid and 1 drop of triamyl-borate. Heating for about 5 minutes at 135° C. was required to gel an oil consisting of the pentaerythritol ester of conjugated soya fatty acid in which 1% each of ortho-boric acids and anhydrous oxalic acid were dispersed as a catalyst composition.

*Example 3.*—Cut sheets of cotton duck, dried at 135° C. to remove free moisture, were impregnated at room temperature with tung oil in which was dispersed a catalyst composition consisting of triamyl-borate and anhydrous oxalic acid in amounts of 2.0% and 3.0% respectively on the weight of the oil. The impregnated duck sheets were stacked between glass platens and lightly compressed with screw clamps. The assembly was then placed in an oven at 135° C. for one hour to polymerize the oil, and a unitary laminated sheet having smooth glossy surfaces and flexibility, permitting installation without fracturing or delaminating when flexed over curved surfaces (such as on furniture, walls or in electrical apparatus) was obtained. The incorporation of an oil-soluble resin in conjugated type oils produces harder but somewhat less flexible laminated masses in accordance with the amount of resin, and in addition the resin reduces the tendency of the oil to be squeezed out before it has gelled when the sheets are compressed. Only low pressures, e. g. 1 to 100 p. s. i. as are obtained in the rubber bag presses, are required to consolidate the impregnated sheets, and thus the need for expensive high pressure laminating presses is eliminated.

*Example 4.*—Dispersing in tung oil an equal quantity of an oil-soluble, non-heat-hardening, paraphenyl-phenol-formaldehyde resin and heating to 150° C. yielded a highly viscous thermoplastic mass upon cooling to room temperature. Reheating the viscous mass to about 100° C. to liquefy it, dispersing therein for each 100 grams, 1 gram of anhydrous oxalic acid and 5 cc. triamyl borate, and then continuing to heat, resulted in a spontaneous gelation of the mass when the temperature attained 150° C. Substituting equivalent amounts for the triamyl-borate of other boric esters, specifically triallyl-borate, methallyl-borate, methyl-hexalin-borate, trioctyl-borate, triethyl-borate, and triphenyl-borate, produced similar rapid catalytic activity.

The hardness and resiliency of the gelled masses were demonstrated by spheres that were formed by pouring the unpolymerized liquid resin-oil mixture containing the catalyst in round bottom flasks and heating to cause conversion. The resulting spheres of infusible oil and resin mixture had a hardness approaching ivory and when tested by bouncing on a cement floor did not shatter or mar. Temperature-stability of the spheres was determined by placing some in an oven at 100° C. for 24 hours and others in a refrigerator at 0° C. The spheres heated to 100° C. were similar in resiliency to a solid soft rubber ball and would bounce in a like manner with no permant distortion caused by the impacts, and the spheres at 0° C. had about the same properties as at room temperature although somewhat harder. When both spheres attained room temperature, they reacquired their original hardness and toughness.

A gelled sample of the same resin-oil mixture prepared by polymerizing the catalyst-containing mixture in a 2 inch deep open steel mold for 1 hour at 70° C. and 1 hour at 135° C. was hard and tough enough to be machined without breakage into strips as thin as ⅛ inch. Electrical tests conducted on the machined samples were as follows:

| 10⁴ cycles (30° C.) | | | D. C. Resistivity (meg.-cms.) 30° C. |
|---|---|---|---|
| Power Factor | Dielectric Constant | Loss Factor | |
| .0104 | 2.8 | .0291 | 10⁷ |

*Example 5.*—A thermosetting binding composition suitable for holding and insulating wires in coil-form was made of the following:

| | Parts |
|---|---|
| Tung oil | 200.0 |
| Oil-soluble resin (as in Example 4) | 100.0 |
| Anhydrous oxalic acid | 0.5 |
| Triamyl borate | 0.5 |

The oil and resin were heated to 150° C. to disperse the resin in the oil; on cooling to 95° C. the oxalic acid was added with vigorous stirring, and on further cooling to 60° C. the triamyl-borate was added. Asbestos-covered copper wire, formed into a coil having a height of 1¼ inches and a diameter of 3 inches by winding on a mandrel, was placed in a closely-fitting cylindrical glass vessel, and sufficient amount of the freshly-prepared liquid resin-oil mixture was poured in the vessel at 60° C. to completely immerse the coil. The vessel and its contents were heated to 130° C. in an oven, and after 10 minutes exposure, the resin-oil mixture had set to a hard, infusible rubbery mass. The resultant disc shaped body, containing the embedded coil, after further curing at 130° C. for 24 hours was horn-like, and on being sawed in half it showed thorough curing and homogeneous structure. The gelation of the oil-resin mixture proceeded without measurable expansion or contraction, and the gelled mass was readily removed from the glass vessel with little or no adhesion to the glass surface. The gelled mass was resistant to solvents, acids and alkalies, and even when heated to a decomposing temperature remained infusible.

*Example 6.*—An indurated composition suitable for use in brake linings, clutch facings, stair treads and the like was made of the following composition:

| | Parts |
|---|---|
| Tung oil | 100.00 |
| Oil-soluble resin (as in Example 4) | 100.00 |
| Anhydrous oxalic acid | 2.00 |
| Triamyl borate | 0.12 |
| Asbestos fibers | 22.00 |

The liquid resin-oil mixture was prepared as in Example 4, and after the addition of the catalysts, was cooled to 60° C. The asbestos fibers were then stirred into the mixture, and the mass poured into a metal pan to form a layer ¼ inch deep. The composition was cured into a tough infusible rubbery mass by being placed under an infra-red lamp for 30 minutes. Dried cork flour or wood flour substituted for the asbestos fibers, yielded compositions that upon gelling had properties suitable for floor coverings, while the incorporation of abrasive grains, such as sand, garnet or synthetic abrasives, yielded abrasion-resistant masses suitable for stair treads.

In place of the oil-soluble phenolic resin, cumarone resin, ester gum, run congo resin, rosin, and other fatty oil soluble resins, can be used to produce similar rubbery, infusible gelled masses. A small amount of iron oxide, about 1 to 4 per cent on the weight of the oil or resin-and-oil mixture, added prior to polymerization is of advantage in increasing the hardness of the resultant gel, especially with rosin that tends to give softer gels than the phenolic or coumarone resins.

Waxes can also be incorporated in limited amounts, usually not exceeding 30% of the total in the oil or oil-resin mixtures, prior to polymerization, and the waxes do not sweat out of the gelled mass even at elevated temperatures. Paraffin in amounts up to 30% decreases the tensile strength but increases the flexibility and yields gelled masses having excellent recovery from dents. Carnauba wax or high melting point chlorinated-naphthalenes contribute hardness to the gelled masses but attended with some increase in brittleness.

Conventional liquid plasticizers compatible with unpolymerized conjugated fatty oils, for instance the phthalate esters of monohydric alcohols, aryl phosphates and phthalates, and alkyl abietates can be added to modify the flexibility and hardness of the gelled composition. Non-conjugated fatty drying oils, for instance raw linseed oil, soya and castor oils, also function as platicizers, since the catalyst compositions do not convert them to a gelled mass, although extended heating in their presence measurably increases the viscosity of these oils. Even large amounts, e. g. 50%, of plasticizers on the weight of the gelled composition remain in solid solution, and only upon subsequent exposure of the plasticized gelled mass to high temperatures is "sweating" out of the plasticizer noticeable. Such behaviour is also observed when the conjugated fatty oil is catalytically polymerized while in solution in an organic solvent, such as toluol, methyl ethyl ketone or a predominantly aliphatic hydrocarbon solvent (such as "Solvesso No. 1"), for a solution of equal parts of fatty oil and solvent heated with any of the catalyst compositions gives a soft dry gel in which the solvent is retained.

To form adherent infusible gelled coatings or impregnants with respect to porous surfaces, the conjugated fatty oil composition containing the catalyst composition is either reduced with solvent, or heated to reduce its viscosity for easy application by brushing, spraying or dipping; after the coating has been applied, it is preferably baked at low to moderate temperatures until the composition has gelled. This procedure is preferred for the coating of porous or rough surfaces such as paper, textiles, wood and unpolished or porous metal surfaces, since such surfaces promote mechanical adhesion.

For coating polished metal and glass surfaces that are poorly adapted as recipient surfaces for the fatty oil composition after polymerization has taken place, especially when solvents or other adhesion-promoting means are absent from the coating composition (though the absence of adhesion-promoting means is of decided advantage when the fatty oil compositions are employed in molding compositions, since the molded objects are readily released from the mold cavity), another procedure is preferred. This is based upon catalytically-polymerizing the fatty oil composition while suspended in an excess quantity of volatile organic solvent; with very dilute solutions of about 10% fatty oil content and adequate agitation to disperse the catalyst compositions in the oil and solvent, the oil upon gelling is so dispersed that a suspensoid is formed, and this can be concentrated to as much as 50% solids content without coalescence of the particles. The suspensoids deposit films that air-dry to a non-tacky condition in less than 5 minutes when the solvent is fairly volatile; the films have good adherence to glass, tin and other polished surfaces, and they are hard and flexible even when as much as 50% of brittle oil-soluble resin has been incorporated.

*Example 7.*—A vehicle-base for coatings was prepared by heating to 150° C. an oil-soluble paraphenyl-phenol-formaldehyde resin and an equal quantity of tung oil together with anhydrous oxalic acid 1% on the total weight. The hot liquid mixture was divided into 3 portions and each portion mixed with other ingredients as follows:

A. To one portion, maintained liquid by heating, there was added with intensive mixing 3% quantity of low molecular weight fatty oil-soluble liquid polystyrene resin (as an adhesion promoter), 1% iron oxide (to increase hardness) and 2% triamyl borate. Chemically-etched steel panels were coated with the hot mixtures and then baked for one hour at 135° C. resulting in polymerization of the coatings into hard and adherent infusible films.

B. To a second portion of the vehicle base there was added the same quantity of liquid polystyrene and triamyl-borate as in A and in addition 10% of paraffin. This coating mixture was applied hot to steel panels and baked for 1 hour at 135° C. yielding softer and more flexible infusible coatings than those of A, but yet having good adherence.

C. To the third portion of the vehicle base in addition to the same amount of liquid polystyrene and triamyl-borate as in A, there was added 30% of 40 mesh synthetic abrasive grains, and the mixture was applied hot to steel panels that were subsequently baked at 135° C. to polymerize the coatings. The adherence of the coatings to the steel panels was good, and the abrasive grains were firmly retained in the coating as demonstrated by wear tests duplicating service conditions for non-slip floor coatings.

*Example 8.*—A flash-bake printing ink was prepared by heating together to 120° C., 3 parts of tung oil and 1 part of fatty oil-soluble substituted-phenol-aldehyde resin. After the resin was dispersed in the oil, the mixture was cooled, and 100 parts were ground on paint rolls for dispersing therein 18 parts of carbon black and a catalyst composition of 2 parts ortho-boric acid and 2 parts hydrated-oxalic acid. A viscous black ink was obtained that, when printed on unglazed paper by a proofing press and the printed paper then baked for 5 minutes at 115° C., was sufficiently polymerized to be free from smudging when rubbed.

*Example 9.*—An air-drying coating composition of a suspensoid type containing highly dispersed minute gelled particles of a fatty oil-resin mixture was prepared by refluxing together the following:

| | Parts |
|---|---|
| Volatile mineral spirits | 1000 |
| Paraphenyl-phenol-formaldehyde resin | 50 |
| Tung oil | 50 |
| Anhydrous oxalic acid | 1 |
| Ortho-boric acid | 1 |

After a 20 minute reflux to cause polymerization of the resin and oil, a portion was removed and concentrated to 50% solids without causing coalescence of the gelled particles. The concentrated liquid was flowed on steel panels and allowed to dry at room temperature. A non-tacky film was obtained within a 5 minute drying period, and overnight drying by eliminating residual solvent yielded a hard film having good flexibility. By extending the refluxing time to 3 hours and then concentrating to 50% solids, a coating composition was obtained having even better solvent-release properties, since it deposited a film drying to non-tacky in less than 5 minutes and print-free within the next half hour.

Fatty drying oils of the non-conjugated type, such as linseed and soya oils, do not form gelled products upon heating in the presence of the catalyst compositions, although there is observed a pronounced increase in viscosity over that obtained for equivalent heating in the absence of catalyst composition. It is believed that in the presence of the catalyst only simple linear type polymerization occurs and that the absence of conjugated bonds is the probable explanation for the failure to convert into infusible gel products. Such oils, however, in amounts up to 75% can be mixed with fatty oils of the conjugated type, and the mixture, heated in the presence of the catalyst compositions, readily converts into infusible gel products. Oil mixtures containing about 85% or more of non-conjugated fatty oils result in semi-fluid gels upon heating in the presence of the catalyst composition; such semi-fluid gels eventually harden when exposed to oxygen. The non-conjugated fatty oils can be used as permanent plasticizers and/or diluents to modify the properties of the gelled conjugated fatty oils for producing softer or more flexible compositions.

The tough resilient character of the gelled fatty oil composition produced in accordance with the present invention together with their inertness, good electrical properties and chemical and heat resistance make them applicable to diverse uses, including moisture-proof sealing compositions, electrical insulation, floor covering, non-slip treads, printing rollers, casting or molding compositions, and rapid-hardening coating compositions.

This application is a continuation-in-part of U. S. application Serial No. 335,322 filed May 15, 1940 which has now become Patent No. 2,374,316.

What is claimed is:

1. An infusible product comprising a conjugated double bond fatty drying oil polymerized in the presence of a catalyst composition of an oxy-boron compound and a member selected from the group consisting of alpha-hydroxy-aliphatic acids, ortho-hydroxy-aromatic acids, oxalic acid and esters of such acids.

2. An infusible product comprising a conjugated double bond fatty drying oil and a fatty drying oil-soluble resin reacted together in the presence of a catalyst composition of an oxy-boron compound and a member selected from the group consisting of alpha-hydroxy-aliphatic acids, ortho-hydroxy-aromatic acids, oxalic acid and esters of such acids.

3. An infusible product comprising a mixture of a conjugated fatty drying oil and up to 75% of a non-conjugated fatty drying oil polymerized in the presence of a catalyst composition of an oxy-boron compound and a member selected from the group consisting of alpha-hydroxy-aliphatic acids, ortho-hydroxy-aromatic acids, oxalic acid, and esters of such acids.

4. A thermosetting composition comprising an unpolymerized fatty drying oil containing conjugated double bonds and a catalyst composition of an oxy-boron compound and a member selected from the group consisting of alpha-hydroxy-aliphatic acids, ortho-hydroxy-aromatic acids, oxalic acid and esters of such acids.

5. A coating composition comprising a colloidal dispersion in a volatile solvent of a gelled mixture of a fatty drying oil-soluble resin and a fatty drying oil containing conjugated double bonds said gelled mixture having been gelled in the presence of an excess quantity of solvent and a catalyst composition of an oxy-boron compound and a member selected from the group consisting of alpha-hydroxy-aliphatic acids, ortho-hydroxy-aliphatic acids, oxalic acid, and esters of such acids for promoting the gelation.

6. A thermosetting casting composition comprising an unpolymerized conjugated fatty drying oil in admixture with a fatty drying oil-soluble resin, a dry filler and a catalyst composition of an oxy-boron compound and a member selected from the group consisting of alpha-hydroxy-aliphatic acids, ortho-hydroxy-aromatic acids, oxalic acid and esters of such acids.

7. The product of claim 1 in which tung oil is the fatty material.

8. The product of claim 2 in which the fatty drying oil-soluble resin is a substituted phenol-aldehyde resin.

9. The product of claim 3 in which the non-conjugated oil is linseed oil.

10. A flexible laminated body comprising a plurality of plies bonded together by a binder comprising a fatty oil composition containing conjugated double bonds rendered infusible by the presence of a catalyst composition of an oxy-boron compound and a member selected from the group consisting of alpha-hydroxy-aliphatic acids, ortho-hydroxy-aromatic acids, oxalic acid and esters of such acids.

11. Process for converting a fatty oil containing conjugated double bonds into an infusible product which comprises subjecting the fatty oil to the joint catalytic action of an oxy-boron compound and a member selected from the group consisting of alpha-hydroxy-aliphatic acids, ortho-hydroxy-aromatic acids, oxalic acid and esters of such acids.

12. Process for making a thermosetting composition which comprises dispersing in a fatty oil containing conjugated double bonds a catalyst composition consisting of an oxy-boron compound and a member selected from the group consisting of alpha-hydroxy-aliphatic acids, ortho-hydroxy-aromatic acids, oxalic acid, and esters of such acids.

13. Process for converting a mixture of a fatty drying oil-soluble resin and a fatty oil containing conjugated double bonds into an infusible mass, which comprises heating up to 200° C. the mixture of resin and fatty oil in the presence of a catalyst composition of an oxy-boron compound and a member selected from the group consisting of alpha-hydroxy-aliphatic acids, ortho-hydroxy-aromatic acids, oxalic acid, and esters of such acids.

14. Method of polymerizing a mixture of conjugated and nonconjugated fatty oils to form an infusible product, which comprises dispersing in the oil mixture a catalyst composition of an oxy-boron compound and a member selected from the group consisting of alpha-hydroxy-aliphatic acids, ortho-hydroxy-aromatic acids, oxalic acid and esters of such acids.

15. Method of making a coating composition which comprises dissolving a fatty drying oil-soluble resin and a conjugated fatty drying oil in a solvent, dispersing in the solution a catalyst composition of an oxy-boron compound and a member selected from the group consisting of alpha-hydroxy-aliphatic acids, ortho-hydroxy-aromatic acids, oxalic acid, and esters of such acids, and heating the mixture to accelerate polymerization of the fatty oil in the presence of sufficient solvent to prevent particle coalescence of the polymerized oil.

16. Method of making a flexible laminate which comprises impregnating moisture free cellulosic sheets with a liquid binder comprising a conjugated fatty oil and a catalyst mixture of an oxy-compound of boron and a member selected from the group consisting of alpha-hydroxy aliphatic acids, ortho-hydroxy-aromatic acids, oxalic acid and esters of such acids, assembling the sheets in a sandwich, and subjecting the sandwich to heat and pressure to indurate the binder.

17. Method of making a flash baking printing ink which comprises mixing coloring matter with a mixture of a fatty drying oil-soluble substituted phenol-aldehyde resin and a conjugated fatty drying oil and incorporating a catalyst composition of an oxy-boron compound and a member selected from the group consisting of alpha-hydroxy-aliphatic acids, ortho-hydroxy-aromatic acids, oxalic acid and esters of such acids.

18. Method of gelling compositions containing a conjugated fatty oil which comprises subjecting the oil to the catalytic action of oxalic acid and an ester of boric acid.

19. Method of gelling compositions containing a conjugated fatty oil which comprises subjecting the oil to the catalytic action of salicylic acid and an ester of boric acid.

20. Method of gelling compositions containing a conjugated fatty oil which comprises subjecting the oil to the catalytic action of boric acid and an ester of oxalic acid.

LEO R. WHITING.

REFERENCES CITED

The following references are of record in the file of this patent:

UNITED STATES PATENTS

| Number | Name | Date |
| --- | --- | --- |
| 2,041,728 | Schneider | May 26, 1936 |
| 2,047,149 | Koenig | July 7, 1936 |
| 2,079,626 | Morgan | May 11, 1937 |
| 2,142,077 | Rust | Dec. 27, 1938 |
| 2,374,316 | Whiting | Apr. 24, 1945 |